Figure 1:
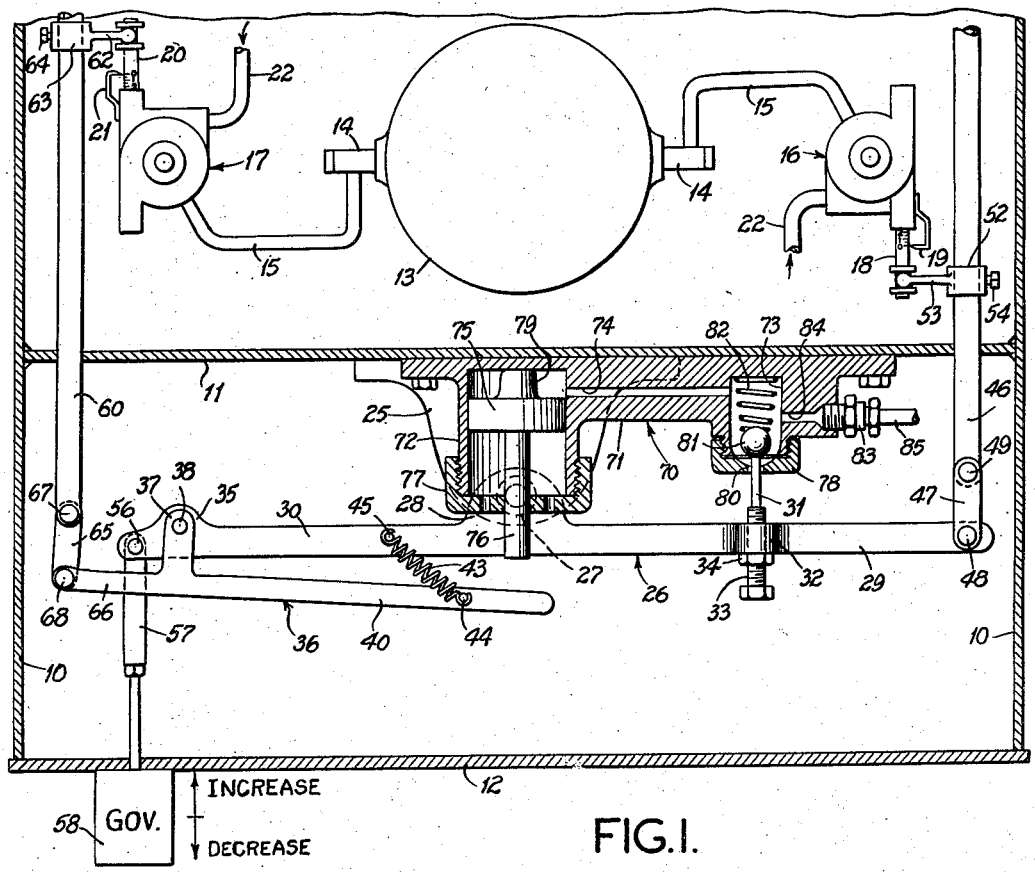

Aug. 8, 1950          H. DAVIDS          2,518,291

ENGINE FUEL CONTROL

Filed April 1, 1946                                2 Sheets-Sheet 1

INVENTOR;
HANS DAVIDS

BY

ATTORNEY

Aug. 8, 1950 — H. DAVIDS — 2,518,291
ENGINE FUEL CONTROL

Filed April 1, 1946 — 2 Sheets-Sheet 2

INVENTOR;
HANS DAVIDS

BY
Paul N. Kuehn
ATTORNEY

Patented Aug. 8, 1950

2,518,291

UNITED STATES PATENT OFFICE 2,518,291

ENGINE FUEL CONTROL

Hans Davids, Beloit, Wis., assignor to Fairbanks, Morse & Co., Chicago, Ill., a corporation of Illinois Application April 1, 1946, Serial No. 658,655

6 Claims. (Cl. 123—139)

This invention is directed to internal combustion engines of the type having a plurality of means for supplying fuel to each cylinder and is particularly concerned with novel and improved means for controllably regulating the action of such fuel supply means in response to engine operation.

While the present improvements may, of course, be availed of for use in a number of different and varying engine installations of the so-called dual fuel feed type, it is peculiarly pertinent to engines of the opposed piston Diesel type where such engines are employed as prime movers for railway work for example, or in any situation where the prime mover is subjected to alternate periods of operation under load and operation at no load or idling conditions.

It is to be understood, therefore, that the invention may have wide application in the art of controllable regulation of prime movers equipped with dual fuel supply means common with each cylinder, but for present understanding of purpose the following description will be devoted to an exemplary disclosure which relates to an opposed piston type Diesel engine for use or application as a locomotive prime mover.

Optimum operating conditions for an engine of the type above noted are especially difficult of attainment when the load characteristics run to extremes, such as that which prevails in railway work. Such an engine, when called upon to operate at continuous full load conditions, may be made to operate effectively with dual fuel supply means and with the proper degree of mixing turbulence for efficient results. But the same engine when reduced to idling speed at no loading or operating at low speed with light loading will be over supplied by the fuel supply means due to mechanical and other difficulties in obtaining efficient fuel delivery action of the respective fuel supply means when throttled. The over supply of fuel is wasteful, produces dilution of engine lubrication oil in the crankcase and, more importantly, is hazardous to safe operation as the excess fuel which finds its way into the crankcase area will in time accumulate in sufficient amounts to create an explosive mixture with the air therein. It is important then in adapting Diesel engines of the opposed piston type to railway locomotive usage, as switcher or transfer units, that the fuel supply means be arranged to deliver a volume of fuel which can be utilized almost completely and in keeping with the loading characteristics imposed thereon.

Accordingly, it is a principal object of the present invention to provide novel and improved regulating means for determining the operation of a plurality of fuel supply means in a Diesel engine of the opposed piston type such that the objectionable operating characteristics above expressed may be obviated.

It is an object also to provide improved control mechanism which is responsive to engine operation for regulating the engine fuel supply means such that less than all of the fuel supply means may be conditioned to maintain engine operation at certain predetermined times and at other times all of the fuel supply means may be brought into effective operation, it being noted that in a multi-cylinder engine having a plurality of fuel supply means associated with each cylinder the present object will be satisfied if one or less than all of the fuel supply means for each cylinder is operated at certain times and at other times all of the fuel supply means are operated.

A further object of the invention resides in the provision of novel control mechanism which will operate in a predetermined sequential manner to maintain fuel delivery to each of the cylinders of a multi-cylinder engine from one or less than all of the fuel supply means associated with each cylinder when the engine is operating at idling speed with no load or at low speed with light load, and will operate to cause fuel delivery from all of the fuel supply means associated with each cylinder in substantially equal quantities when the engine is operating at increased speed up to full load or, at least, with loads greater than light loads.

Figure 3:
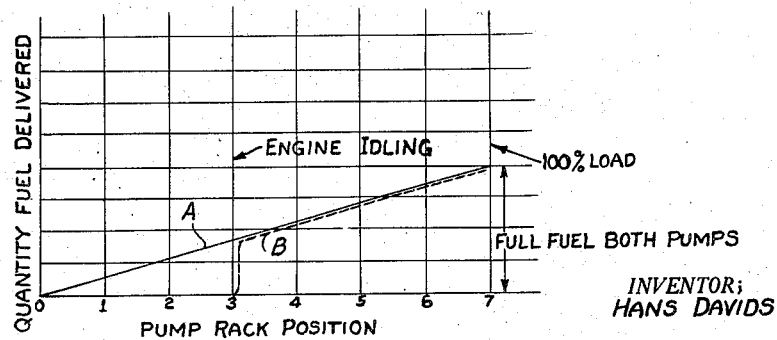
Figure 2:
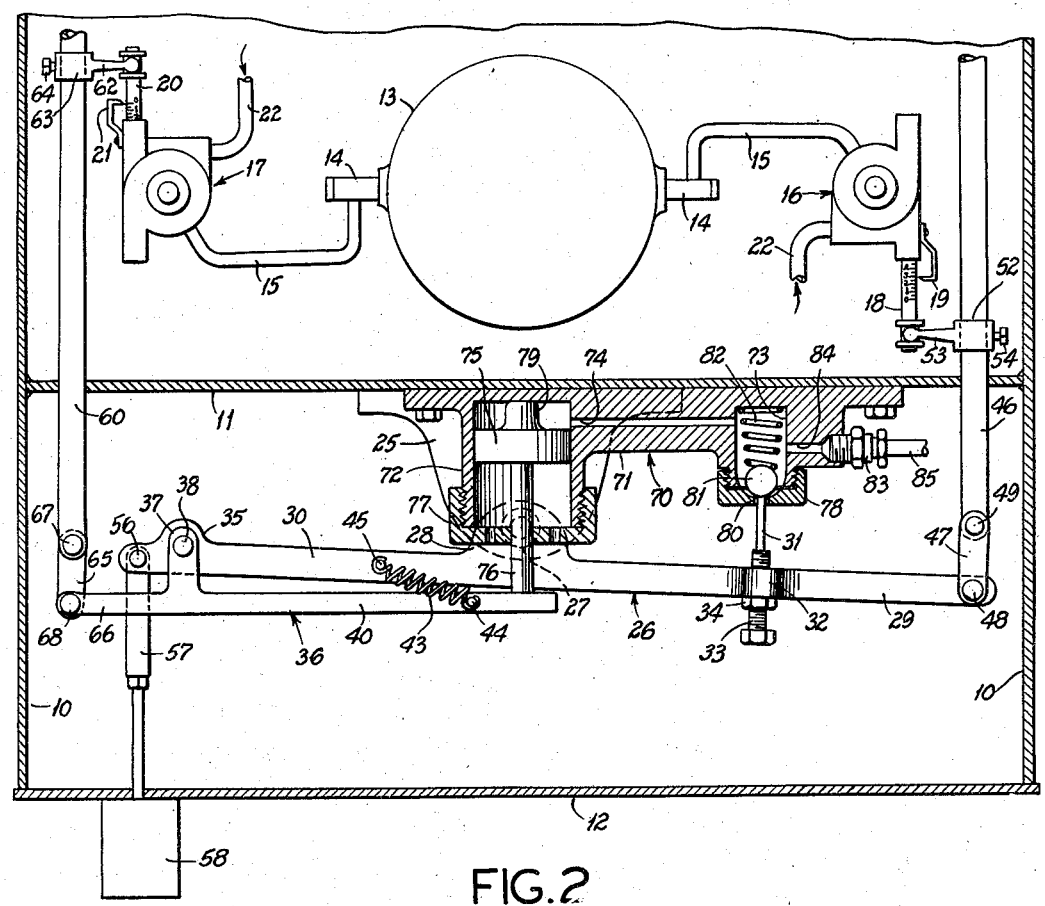

Other objects and advantages will appear from the following description of a preferred embodiment of the invention which is disclosed in the accompanying drawing, in which:

Fig. 1 is a schematic illustration of an engine showing the novel and improved control mechanism, which constitutes the basis of the present invention, in controlling association with the fuel supply means for each cylinder of an internal combustion engine, it being noted that only one engine cylinder has been indicated;

Fig. 2 is a view similar to that of the preceding illustration but having the control mechanism adjusted, in response to governor action, to a control setting commensurate with low speed, no load or light load engine operation; and Fig. 3 is a graphical disclosure of the preferred operating characteristics for the fuel supply means associated with any one of the engine cylinders and in which the quantity of fuel from at least two fuel supply means connected with a common engine cylinder has been plotted against control setting thereof for the full range of engine operation from zero fuel delivery to maximum, the solid line A denoting the curve for one fuel supply means and the dotted line B denoting the curve for the other fuel supply means.

In the drawing there is shown in schematic form only such portions of a Diesel engine as will serve to aid a full understanding of the invention. The engine may have a frame structure comprised, in part at least, of side plates 10, an end wall 11 and an end closure plate 12. The engine cylinders, such as the one indicated at 13, are each equipped with at least two airless type fuel injection nozzles 14 of substantially identical construction, respectively receiving fuel under pressure through conduits 15 from separate fuel supply means or pumps 16 and 17 suitably mounted on frame deck plates (not shown) at opposite sides of the cylinder.

As a basis for further description of the operating elements and control function thereof, a brief reference will be made to the characteristics of the fuel pumps here preferred, although they do not constitute per se, a part of the invention. Each pump is of a well known and commercially obtainable type having a constant stroke reciprocable plunger which can be angularly adjusted about its major axis to permit variable fuel cut-off settings. The pump 16 is provided with a fuel cut-off control rack 18 for the purpose of varying the pump output between no fuel and full fuel positions as indicated by suitable index marks scribed on the rack surface in conjunction with a fixed pointer element 19 carried by the pump casing. Similarly pump 17 has a fuel cut-off control rack 20 so that its output may be varied between no fuel and full fuel positions, the same being indicated on the rack surface in conjunction with a fixed pointer 21 mounted on the pump casing.

While it is not believed necessary to show the usual type of pump plunger operating means, it will be appreciated by those skilled in the art that each pump will be driven from engine operated cam shafts so that fuel supplied to each pump via conduits 22 will subsequently be delivered under pressure and in the determined quantity through conduits 15 to the common combustion space of the cylinder 13.

Referring now to the disclosure of Fig. 1 as it relates to the form, construction and arrangement of parts in the control system, a suitable bracket 25 secured at the end wall 11 of the engine frame supports a primary control lever 26 for pivotal movement about a vertically directed pivot element 27 engaging the lever in its centrally located boss 28. The primary lever has oppositely extending arms 29 and 30, which are, in the present example, of somewhat unequal lengths as measured from a point on the lever 26 perpendicularly opposite the center line of pivot element 27. Lever arm 29 also carries a feeler element or sequence control pin 31 adjustably, threadedly mounted in boss 32 on the lever arm, as by the integrally formed and enlarged screw element 33 and locking nut 34. The purpose of this sequence control pin will appear presently. Arm 30 of the primary control lever 26 is formed with an extended boss 35 for the pivotal mounting of a secondary control lever 36, the latter lever having a similar boss 37 overlying boss 35 for connection thereto by pivot pin 38. Thus it can be seen that the respective arms 29 and 30 of primary lever 26 swing about the axis of pivot pin 27, and that the secondary lever 36 is swingable relative to, but supported on the arm 30 so that it may have a dependent as well as an independent motion.

With further reference to the secondary lever 36, it will be noted that its longer arm 40 is pivotally urged toward the arm 30 of the primary lever 26 by a resilient, or spring element 43 fixed to the arm 40 at pin 44 and to arm 30 at pin 45.

In an arrangement of this character, the secondary control lever 36 may be described as having an independent or lost-motion movement relative to the primary control arm. The purpose and effect of this arrangement will be described in more detail hereinafter.

Primary control lever 26 is operatively connected by its arm 29 with a longitudinally shiftable pump control rod 46 through an operating motion compensating link 47 which is pivoted to arm 29 at 48 and to rod 46 at 49. Thus pivotal motion of lever 26 is reflected in longitudinal motion of the control rod 46. As seen in Fig. 1, the rod 46 carries a drive fitting 52 having an arm 53 which is suitably secured in driving relation with the end of the pump control rack 18. This fitting is sleeved on control rod 46 so as to be initially positioned thereon for a zero pump rack setting when the control rod 46 is fully retracted to an engine "off" position. With this condition satisfied, the set screw 54 may be tightened up to fix the drive fitting 52 in adjusted position upon the control rod.

The opposite end or arm 30 of the primary control lever 26 is pivotally connected at 56 to a push-pull link 57 of an engine driven governor carried by the frame plate 12 and indicated generally at 58. The governor 58 is adapted to move the link 57 in a direction to swing the primary control lever 26 in a clockwise direction about pivot 27 to increase fuel and in the opposite sense to decrease fuel, all in response to engine operation.

It will now be evident that the fuel pump 16, or a bank or series of similar pumps in a multi-cylinder engine in which each thereof is drivingly connected to rod 46 by means of the type shown at 52, is directly and at all times adjusted and controlled by the governor 58 to increase or decrease its fuel delivery capacity in accordance with the engine speed and, hence, load imposed on the engine. The governor motion is transmitted to the control rod 46 through the action of the primary control lever 26 in the manner described above.

A second shiftable pump control rod 60 is provided for actuating the control rack 20 of fuel pump 17. Specifically, the rack 20 is connected to the rod 60 through the arm 62 of a drive fitting 63 sleeved on the rod and secured in adjusted position by the set screw 64 such that when the control rod is fully retracted the pump rack will be at its "no fuel" position or zero index. The inner end of the control rod 60 is pivotally connected through an operating motion compensating link 65 to the arm 66 of the secondary control lever 36. Pivot elements 67 and 68 serve to interconnect the last described parts in the manner shown.

The operation of the mechanism above described results in a selective or sequential control of fuel pump 17 for at times maintaining the same out of phase with fuel pump 16 and at other times conditioning the same for adjustment into a substantially equal control phase depending upon a condition of independent or dependent motion of the secondary control lever 36 relative to the primary control lever 26 as will now be described. This condition of operation is in accord with an expressed objective of the present invention and is obtained in the following manner: Assuming that the control system with the engine shut off is held by the governor 58 in its "off" position, it will be observed that the secondary lever 36 is in a displaced or angular position relative to primary control lever 26 such that the pump rack 20 is at its zero position and the construction and initial relation of the mechanism forces the control lever 36 to pivot against the spring 43. It is also noted that the pump rack 18 is in its zero position. Now as the engine starts up under no load but does not exceed a speed commensurate with no load or light loads, the governor 58 will respond by moving push-pull link 57 outwardly to a predetermined position corresponding with engine speed. This motion of link 57 swings the primary control lever 26 clockwise as in Fig. 2, such that the fuel pump 16 will have its rack 18 moved to or closely adjacent the index mark 3, for example. During this initial predetermined movement of primary control lever 26 the secondary control lever 36 will be moved through its pivotal connection at boss 35 on lever 26, but by the action of the resilient element or spring 43 the said lever 36 is constantly urged in a counter clockwise direction. This tends to urge the control rod 60 in a direction to maintain no fuel delivery by pump 17, and as a result the secondary lever 36 will swing in its independent or lost motion relation to a position alongside the primary control lever. Thus, no advance of the control rod 60 for fuel pump 17 can occur. When these conditions are met, the engine is being supplied with fuel from the pump 16 alone, and pump 17 is maintained or remains ineffective and out of phase.

In the present example it is preferred to arrange and adjust the over all control mechanism for attaining just such a condition as has been described. As a consequence thereof, only one pump of the dual fuel supply means is initially operative to start and continue engine operation up to say, idling speed or slightly higher and with no load or light loads imposed on the engine.

Now should a load be imposed on the engine, the governor will immediately respond by moving link 57 in a fuel increasing direction. Primary control lever 26 will be moved farther in a clockwise direction, whereby to advance control rod 46 and increase the fuel delivery output of pump 16. Incident to this motion of the primary lever 26, secondary control lever 36 will no longer have relative lost-motion but will attain a condition of dependent motion relative to the lever 26 through the energization of a sequence control type of fluid interlock device, generally indicated at 70. When this interlocking device is energized it will prevent further independent movement of the secondary control lever 36 and simultaneously shift the latter to a position in which the fuel pump 17 is synchronized with or brought into substantially equal fuel output control phase with the fuel pump 16. Thereafter the two fuel pumps will remain "in phase" for load increases on the engine.

It is important to point out that the respective fuel pumps are effectively maintained in phase due to the proportioning of the several arm lengths of the levers 26 and 36. For example, it is preferred to have the length of arm 29 on primary lever 26, as measured from a point opposite the axis of pivot 27, equal to the oppositely extending and combined effective lengths of arm 30 on lever 26 and arm 66 on secondary lever 36, when the latter lever has been shifted to a position of dependent motion relation with primary lever 26 by the fluid interlock device 70. By so proportioning the arms of the control levers, it will be apparent that the arms will move in a one-to-one ratio about the center pivot 27, but only when the fluid interlock device is energized as will now be described.

The fluid interlock device 70 comprises a housing 71 having a cylinder 72 at one end and a valve chamber 73 at its opposite end, the cylinder and chamber being in constant communication through a small passage 74. The housing is mounted on the end wall 11 of the engine frame with the cylinder axis in alignment with the arm 40 on control lever 36 such that a piston 75 movably positioned in the cylinder may have its rod 76, projecting outwardly of a vented cylinder cap 77, movable into abutment with the arm 40 at certain times and such that the arm 40 may abut the piston rod end at other times. When this fluid device is not energized the piston is free to move inwardly of the cylinder where it bottoms on a boss 79 to prevent closure of the passage 74. At the opposite end of the housing 71, the valve chamber is provided with a cap 78 having a port 80, a ball valve element 81 and a spring 82 adapted normally to urge the ball element into port closing position against the cap. This device is, by preference, supplied with fluid under pressure, through fitting 83 threaded into the housing and in open communication with the valve chamber 73 through passage 84. In the present example a conduit 85 from the engine lube-oil system (not shown) is connected at fitting 83.

In operation the fluid interlock device will at times direct pressure fluid to the cylinder 72, as when the port 80 is closed by ball 81, to force the piston outwardly. However, when the ball valve element is unseated fluid will immediately flow through the ported cap and relieve fluid pressure in cylinder 72. Fluid flowing through the port 80 in cap 78 is by any suitable means (not shown) returned to the engine crankcase. According to a preferred construction the fluid passage 74 is of small bore to offer resistance to flow such that the outward movement of the piston 75 is gradual and thus does not cause a sudden movement of lever 36, which would tend to overload the governor 58.

Energization of the fluid interlock device is controlled in timed relation with movement of primary control lever 26 by the sequence control pin element 31 carried by the lever in the manner before noted. In the present example, the pin 31 is positionally adjusted such that it will maintain the ball valve 81 in port open position until arm 29 of primary control lever 26 has been moved in a clockwise direction for regulating pump 16 to increase its fuel output, and where additional fuel is required to operate the engine, commensurate with load increases above idling or light load conditions. As this condition of engine operation is attained, the ball valve 81 will close port 80 cutting off escape of fluid and thus causing the gradual build-up of pressure in cylinder 72 through the flow restricting passage 74 to move piston 75 outwardly of the cylinder such that piston rod 76 abuts the arm 40 on secondary control lever 36 to swing the latter in a clockwise direction into an angular position such that the control rod 60 is advanced to move rack 20 at fuel pump 17. The motion imparted to the secondary control lever 36 is, by preference, sufficient to bring fuel pump 17 into "in phase" relation with pump 16 whereby the two pumps will deliver substantially equal quantities of fuel to their respective injection nozzles 14. So long as the piston 75 is fluid energized and in abutment with arm 40 it will be apparent that the secondary control lever 36 is prevented from independent motion, and hence, may be described as dependent for its further movement upon motion of the primary control lever 26.

When the load on the engine decreases or its speed is decreased to or below the light load or idling condition the fuel pumps 16 and 17 will be simultaneously throttled through the concurrent motion of the primary and secondary control levers until the sequence pin 31 again is positioned to lift the ball valve 81 away from port 80. At such latter time, the lost motion take-up spring 43 between the control levers 26 and 36 will urge the piston 75 inwardly as the fluid pressure thereon gradually drops to a zero value or becomes inconsequential due to effective pressure relief at port 80. Control lever 36 will thereupon be moved by the spring in a counterclockwise direction to shift pump control rod 60 and pump rack 20 to its no fuel position, hence cutting off further fuel delivery by pump 17. Continued throttling action by governor 58 will swing primary control lever 26 in a counter clockwise direction and concurrently will cause the secondary control lever 36 to move relatively and in a clockwise sense, as the pump control rod 60 is prevented from further retraction by reason of the pump rack 20 having reached the inner limit of its stroke. As a result, the arm 40 will move out of abutment with the end of piston rod 76 and at engine shut down the secondary lever 36 will again be displaced or angularly related with respect to the primary lever 26, as in Fig. 1.

Turning to Fig. 3, the graph illustrates the respective functions of the pump 16 (in solid line A) and pump 17 (dotted line B) over the full speed and load range of the engine up to 100 percent load. The rack positions indicated by the graph are also to be found on the respective pump rack members 18 and 20. As shown by the graph, the preferred pump operating phases require pump 16 to deliver fuel at all times and pump 17 to begin or terminate fuel delivery at or close to engine idling speed with no load or light loads. This latter condition is attained at or close to position "3" on rack 18, at which position the pump 17 is almost immediately shifted to deliver fuel substantially equally with pump 16 on the sharply rising dotting line curve, or to cease fuel delivery if the control mechanism is shifted to decrease fuel. For engine operation at greater than light loads, both fuel pumps will deliver substantially equal quantities of fuel, hence the two curves A and B above rack position "3" are superposed. However, it should be understood that the actual quantity of fuel delivered is equal to twice the value of any given ordinate, except for rack positions below that at which the dotted line curve B drops to a zero valve.

As a consequence of the preferred pump operating phases, each cylinder of the engine will be supplied initially with fuel from only one pump at such times as it is deemed desirable to limit fuel delivery for the expressed purpose of preventing fuel wastage, crankcase oil dilution and dangerous accumulations thereof within the engine crankcase. The exact point at which the engine is to be operated by less than all of the fuel pumps associated with each of the cylinders will depend on the fuel consumption characteristics within the idling speed range with no load or light loads. However, the critical operating range is normally limited and hence requires only small governor responsive movement to shift pump 17 into or out of operative fuel delivery relationship with pump 16. The advantages for such a system of pump control will at once become evident when it is considered that Diesel engine powered locomotives may have extended periods of operation at idling speed with no load or light load.

It will now be fully apparent that the objectives of the present invention are effectively carried into practice through the functioning of the above described control mechanism, and that the objectionable and hazardous operating characteristics of prior dual fuel systems are entirely obviated in a simple, direct and positive manner. Further discussion of the presently preferred form, construction and arrangement of operating means, elements and agencies for accomplishing the desired results is believed unnecessary, as the foregoing detailed description will provide sufficient basis to those skilled in the art for understanding the underlying principles hereof.

It should be noted, however, that each of the important control elements, such as the sequence pin 31, and drive fittings 52 and 63 respectively, are adjustable in character so that initial assembly adjustments may be made for attaining proper control results; and as the control system exhibits a certain amount of unavoidable wear and loosening, these important elements may be readjusted to restore the proper control.

It is also obvious that the effective stroke of the piston 75 may be varied according to the desired setting of the control lever 36 by the use of shims (not shown) under the vented cap 77 whereby the piston may have greater or less travel within the cylinder bore. The use of shims, spacers or the equivalent is well understood in the art and requires no detailed disclosure beyond the fact that their use is contemplated herewith.

Certain refinements, as well as obvious modifications, substitutions of equivalent parts and alterations in form, assembly or construction hereof, may be suggested from an understanding of the presently preferred system. However, it is intended that all such refinements, substitutions and modifications shall be included within the scope of the invention as the same is defined by the annexed claims.

What is claimed is:

1. Fuel pump control mechanism for an internal combustion engine having at least two adjustable output fuel pumps in fuel delivery association with a common combustion zone of the engine; said mechanism including shiftable means operably connected one to each fuel pump for adjusting the fuel output thereof, pivotally connected and relatively movable cooperative elements operably connected one with each of said shiftable means, said elements being connected and arranged for relative lost-motion movement thereby permitting fuel output adjustments of one fuel pump relative to the other fuel pump during a predetermined initial range of movement of one element, and a control device positioned adjacent said cooperative elements so as to be operated in response to said predetermined movement of one thereof for causing conjoint operation of said cooperative elements whereby to effect concurrent fuel output adjustments of each fuel pump, said device comprising a pluger fluid pressure urged in a direction to cause conjoint operation of said elements, and a pressure fluid control valve movable in response to said one element, said valve attaining a setting to direct pressure fluid to said plunger upon said predetermined movement of said one element.

2. Fuel pump control mechanism for an internal combustion engine having a cylinder and at least two adjustable output fuel pumps operated by the engine and connected in fuel delivery association with the cylinder combustion space; said mechanism including separate shiftable means connected with each of the fuel pumps for adjusting the fuel output thereof, a first control element connected to one of the shiftable means for adjusting the fuel output of the fuel pump connected thereto, a second control element connected to the other of said shiftable means, said second element being carried by said first element for lost-motion movement relative to the latter during a predetermined initial fuel adjusting movement of the latter, and a control device operatively positioned adjacent said control elements so as to be responsive to the predetermined initial movement of said first control element, for preventing further lost-motion movement of said second control element whereby said fuel pumps are simultaneously adjusted as to fuel output, said device having an element movable into abutment with the second control element and means for controlling the movable element.

3. Fuel pump control mechanism for an internal combustion engine having at least two adjustable output fuel pumps in fuel delivery association with a common combustion zone of the engine; said mechanism including fuel output adjusting means for each of the fuel pumps, a first control lever pivoted on the engine and connected at one end to one of said adjusting means, an engine operated governor connected at the opposite end of said first lever for pivoting the latter to cause fuel output adjustments of the fuel pump associated therewith, a second control lever independently pivotally mounted on said first lever and connected at one end to the other of said adjusting means, resilient means operatively connected between said first and second levers in a manner to urge the other of said fuel pump adjusting means connected to said second lever in a fuel output decreasing direction for a predetermined initial governor urged movement of said first lever to move said one fuel pump adjusting means in a fuel output increasing direction, fluid pressure responsive means on the engine positioned adjacent said first and second levers, said last means having a piston displaceable by fluid pressure in a direction to move said second lever in opposition to said resilient means and a pressure relief valve normally urged toward closed position for permitting piston displacement, and means on said first control lever normally adapted to maintain said valve in open position to prevent piston displacement, but movable with said first lever such that said valve closes upon attainment of the predetermined initial movement of said first lever whereby said piston is displaced to move said second lever and the other of said fuel pump adjusting means connected thereto in a fuel output increasing direction.

4. Fuel pump control mechanism as set forth in the preceding claim and in which displacement of said piston is effective to move said second lever and the other of said fuel pump adjusting means connected thereto in a fuel output increasing direction such that each of the fuel pumps is adjusted for substantially equal fuel output.

5. Fuel pump control mechanism for an engine having two adjustable output fuel pumps in communication with a common combustion zone of the engine; said mechanism including first and second control levers relatively movably interconnected and respectively connected in fuel output adjusting relation with a first and a second fuel pump, engine operated governor means operatively connected to move the first lever for adjusting the first fuel pump between no fuel and full fuel delivery conditions, resilient means connected between said levers and acting on the second lever to maintain the second fuel pump substantially at a no fuel delivery adjustment during at least an initial fuel delivery adjustment range of the first fuel pump, and a controllable fluid pressure energized interlock device adjacent said levers for opposing said resilient means to move said second lever for adjusting the second fuel pump into a fuel delivery condition in response to movement of the first lever in a fuel increasing direction beyond the said initial fuel delivery adjustment range of the first pump, said interlock device having a fluid pressure source and providing a fluid pressure urged element abuttable with the second lever, and a control valve normally movable to closed position for supplying pressure fluid to move said element, the valve being positioned for opening actuation by the first lever during the initial fuel delivery adjusting range of the first fuel pump.

6. In an internal combustion engine having a cylinder providing a combustion space to which fuel is supplied by a pair of controllable output fuel pumps; the combination therewith of means comprising a first control lever operatively connected to one fuel pump for regulating its output in response to engine fuel demands, a second control lever operatively connected to the other fuel pump for regulating its output, said second lever being pivotally connected to the first lever for imparting bodily movement to the second lever upon movement of the first lever, resilient means acting on the second lever to pivot the same relative to the first lever and in a direction to maintain said other pump in a no fuel output regulation during a predetermined initial range of fuel output regulation of said one pump, and an interlock device adjacent said levers for effecting relative pivotal movement of the second lever against said resilient means to regulate the fuel output of the other pump toward substantially equal output with said one pump and for interlocking said levers such that the second lever is bodily movable with the first lever, said device being of controllable fluid pressure character having a fluid pressure source and providing a pressure urged element engageable with the second lever, and a control valve normally movable to closed position for supplying pressure fluid to move said element, the valve being located so as to be actuated to an open position by the first lever during its predetermined initial range of regulation.

HANS DAVIDS.

REFERENCES CITED

The following references are of record in the file of this patent:

UNITED STATES PATENTS

| Number | Name | Date |
| --- | --- | --- |
| 1,676,827 | Howard et al. | July 10, 1928 |
| 2,010,469 | Triebnigg | Aug. 6, 1935 |
| 2,221,405 | Nallinger | Nov. 12, 1940 |